United States Patent [19]
Aperlo

[11] 3,738,543
[45] June 12, 1973

[54] MEASURING VALVE HAVING SPRING-LOADED ACTUATING MECHANISM

[76] Inventor: Peter J. A. Aperlo, 15952 Maracaibo, Hacienda Heights, Calif. 91745

[22] Filed: June 1, 1971

[21] Appl. No.: 148,600

[52] U.S. Cl. .................... 222/453, 141/362, 251/78
[51] Int. Cl. ............................................. G01f 11/16
[58] Field of Search ................ 222/365, 453, 450, 222/451; 251/243, 78; 137/625.5, 625.27; 141/360, 361, 362

[56] References Cited
UNITED STATES PATENTS

| | | | |
|---|---|---|---|
| 1,271,840 | 7/1918 | Billings | 222/365 |
| 3,195,574 | 7/1965 | Carls | 251/78 X |
| 307,562 | 11/1884 | Mathews | 141/362 X |
| 824,468 | 6/1906 | Calley | 222/453 |
| 3,580,699 | 5/1971 | Vaughan | 222/453 X |
| 3,612,483 | 10/1971 | Pool | 251/333 |
| 2,659,518 | 11/1953 | Donnelly | 222/453 X |

Primary Examiner—Robert B. Reeves
Assistant Examiner—Thomas E. Kocovsky
Attorney—Howard A. Silber and Philip M. Hinderstein

[57] ABSTRACT

A valve for dispensing a measured volume of liquid includes a spring-loaded actuating mechanism. A measuring chamber is closed at either end by respective valve discs supported by a valve stem. The valve stem and discs are biased to open the inlet end and close the outlet end, thereby permitting liquid to fill the measuring chamber. When the valve stem is displaced by the actuating mechanism, the discs close the inlet end and open the outlet end to dispense a measured volume of liquid.

To insure rapid opening of the measuring valve, an actuating mechanism includes a piston slidingly disposed in a cylinder and attached to the valve stem. A pivotally mounted control lever moves the cylinder so as to compress against the piston a spring contained within the cylinder. When the compressed spring force exceeds the bias on the valve stem, the spring rapidly displaces the piston, valve stem and discs to the liquid dispensing position.

15 Claims, 5 Drawing Figures

3,738,543

INVENTOR.
PETER APERLO
BY Hinderstein & Silber
ATTORNEYS

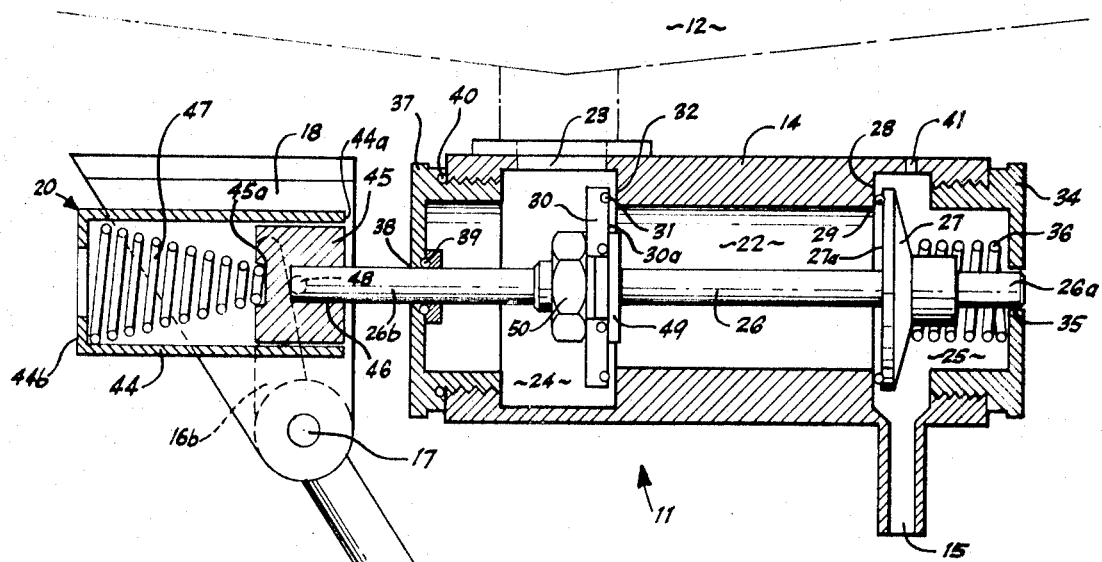
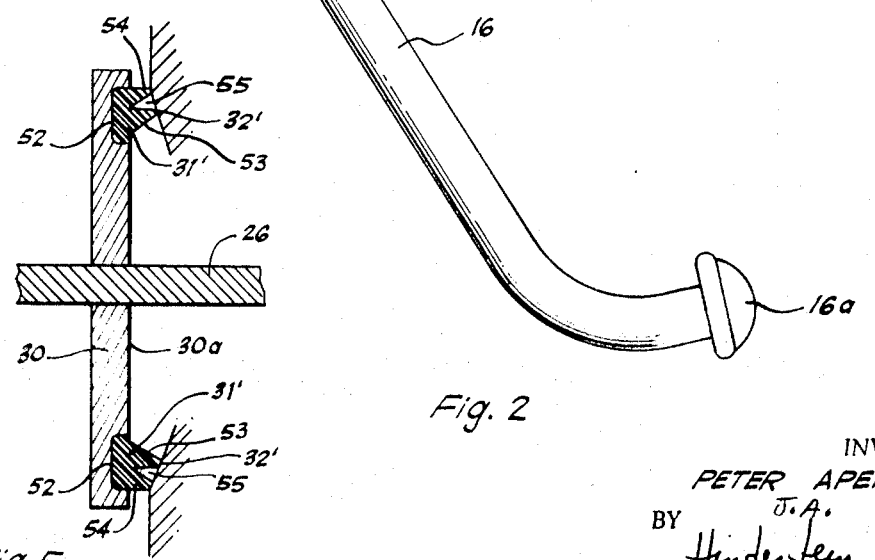
Fig. 2
Fig. 5
INVENTOR.
PETER APERLO

MEASURING VALVE HAVING SPRING-LOADED ACTUATING MECHANISM

BACKGROUND OF THE INVENTION

1. Field of the Invention

The present invention relates to a measuring valve, and more particularly to a device for dispensing a measured volume of liquid upon lever-initiated operation of a spring-loaded actuating mechanism.

2. Description of the Prior Art

In the sale of alcoholic beverages by the drink, and for other applications wherein a liquid packaged in bulk is dispensed in smaller amounts, it is advantageous to utilize a valve which pours an accurately measured volume of the liquid. Use of such dispenser eliminates a separate measuring operation, as for example, the filling of a jigger prior to pouring alcohol into a mixed drink. The time taken to mix a drink thereby is reduced, and more accurate control over the amount of liquor dispensed per drink is achieved. This represents a saving to the user, and results in more uniform ingredient proportions in the drink.

An exemplary prior art device for dispensing measured amounts of a liquid is described in the U. S. Pat. No. 2,039,624 to Bigelow. This device is designed for coin-operated dispensing of cream for coffee, syrup for soft drinks and the like. The device utilizes a measuring chamber having a pair or rod-mounted spaced valves which constitute shiftable end walls for a measuring chamber. A spring biases the valves into the position at which the fluid inlet end is closed and the outlet or spigot end is open. A coin-enabled plunger mechanism forces the rod and valves to a position at which the inlet end is open, permitting liquid to fill the measuring chamber. When the plunger is released, the bias spring moves the rod and valves back to the position at which the outlet end is open, thereby dispensing the liquid.

Several factors limit the accuracy of a measuring valve of the type just described. The measuring chamber is empty at the beginning of the dispensing operation. If the plunger does not move the rod and valves sufficiently far, the outlet end of the measuring chamber may remain slightly open while the measuring chamber is being filled. As a result, an amount of liquid greater than the volume of the measuring chamber may be dispensed. This problem is particularly acute if substantial travel is required to shift the valves between the filling and dispensing positions. If the plunger is released slowly, some liquid will start to pour out before the inlet end is completely closed; excess liquid will be dispensed. Likewise, inaccurate measurement will result if the bias spring returns the valve slowly to the dispensing position.

A measuring valve may be moved rapidly between the filling and dispensing positions by utilizing a solenoid to drive the valves. This approach is illustrated by the U. S. Pat. No. 3,072,302 to Giovannoni et al. Use of a solenoid requires an available source of electricity, and thus is disadvantageous for portable applications.

Another measuring valve with rigidly connected reciprocating valves is shown in the U. S. Pat. No. 2,659,518 to Donnelly. Therein, a spring biases the valves so as to open the inlet end of the measuring chamber; this insures complete filling of the measuring chamber prior to the dispensing operation. Discharge is accomplished by pushing a knob connected to the valve stem to overcome the bias spring force.

In the Donnelly device, the valves both are situated within the measuring chamber, which has a diameter greater than the inlet or outlet chambers communicating therewith. As a result, when the valve is opened to the dispensing position, the measuring chamber will be emptied incompletely. Some of the liquid will remain in the bottom of the measuring chamber, below the level of the outlet chamber shoulder. This arrangement will provide accurate measurement in a stable environment. However, if the valve were used in an aircraft, the vibration present may cause dispensing of the residual liquid at the bottom of the measuring chamber; inaccurate measurement will result.

The present invention overcomes these and other shortcomings of the prior art by providing a measuring valve which insures that an accurately controlled volume of liquid will be dispensed at each operation. The valve is biased to insure complete pre-filling of the measuring chamber. A unique spring-loaded actuating mechanism is utilized to move the valves rapidly to the dispensing position, substantially independent of the amount of force or extent of travel of the control lever. A very short valve travel distance is employed. The valves are situated external to the measuring chamber, in respective inlet and outlet chambers each having a diameter greater than that of the measuring chamber. No liquid remains in the measuring chamber at the end of the dispensing operation.

SUMMARY OF THE INVENTION

In accordance with the present invention, there is provided a measuring valve of the type wherein a preestablished volume of liquid is dispensed when a set of reciprocating valves are moved from a closed, measuring chamber filling position to an open, liquid-dispensing position. Very rapid transition between the filling and dispensing positions of the measuring valve is accomplished by using a spring-loaded actuating mechanism.

In a preferred embodiment, a valve housing includes an interior measuring chamber communicating between an inlet chamber and an outlet chamber each having a diameter greater than that of the measuring chamber. A valve stem extends concentrically through the chambers, and projects beyond the inlet end of the housing to the actuating mechanism. First and second valve discs are attached to the valve stem and are seated respectively in the outlet and inlet chambers. A spring situated in the outlet chamber biases the valve stem to the filling position at which the inlet end of the measuring chamber is open, and the dispensing end is closed. A very short longitudinal movement of the valve stem closes the inlet end of the measuring chamber, and opens the outlet end to dispense an accurately measured volume of liquid.

The actuating mechanism preferably comprises a piston attached to the projecting valve stem end and slidingly disposed within a cylindrical member. A pivotally mounted control lever includes at one end a yoke which partly surrounds the cylindrical member and abuts against a pair of pins projecting laterally therefrom. When the control lever is moved, the yoke displaces the cylindrical member toward the valve mechanism, thereby compressing against the piston a spring situated within the cylindrical member. When sufficient control lever motion occurs so that the force of the compressed spring exceeds that of the bias spring within the valve housing, the compression spring rapidly forces the piston, valve stem and valves to the liquid dispensing position. Thus, valve actuation is accomplished by the loaded compression spring, and not directly by the control lever. Further, valve functioning is not effected by further movement of the control lever beyond the position at which actuation occurs.

A low-profile supply reservoir insures that the pressure head supplying the measuring valve is substantially independent of how much liquid remains in the reservoir. Volume controlling elements may be attached to the valve stem within the measuring chamber to alter the amount of liquid dispensed by the valve. A counter may be connected to the valve stem to tally how much liquid has been poured. The valve mechanism is well-adapted for use as a liquor dispenser in aircraft and other environments.

Thus, it is an object of the present invention to provide an improved measuring valve for dispensing a preselected volume of liquid, and operated by a spring-loaded actuating mechanism.

BRIEF DESCRIPTION OF THE DRAWINGS

Detailed description of the invention will be made with reference to the accompanying drawings wherein like numerals designate like parts in the several figures. These drawings, unless described as diagrammatic or unless otherwise indicated, are to scale.

FIG. 2 is a transverse sectional view, as seen generally along the line 2—2 of FIG. 1, illustrating both the measuring valve and spring-loaded actuating mechanism portions of the invention. The measuring valve is shown in the closed or measuring chamber filling position.

FIG. 5 is a fragmentary transverse sectional view of one valve disc, showing a preferred valve seal configuration.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention, since the scope of the invention best is defined by the appended claims.

Structural and operational characteristics attributed to forms of the invention first described also shall be attributed to forms later described unless such characteristics obviously are inapplicable or unless specific exception is made.

Figure 1:
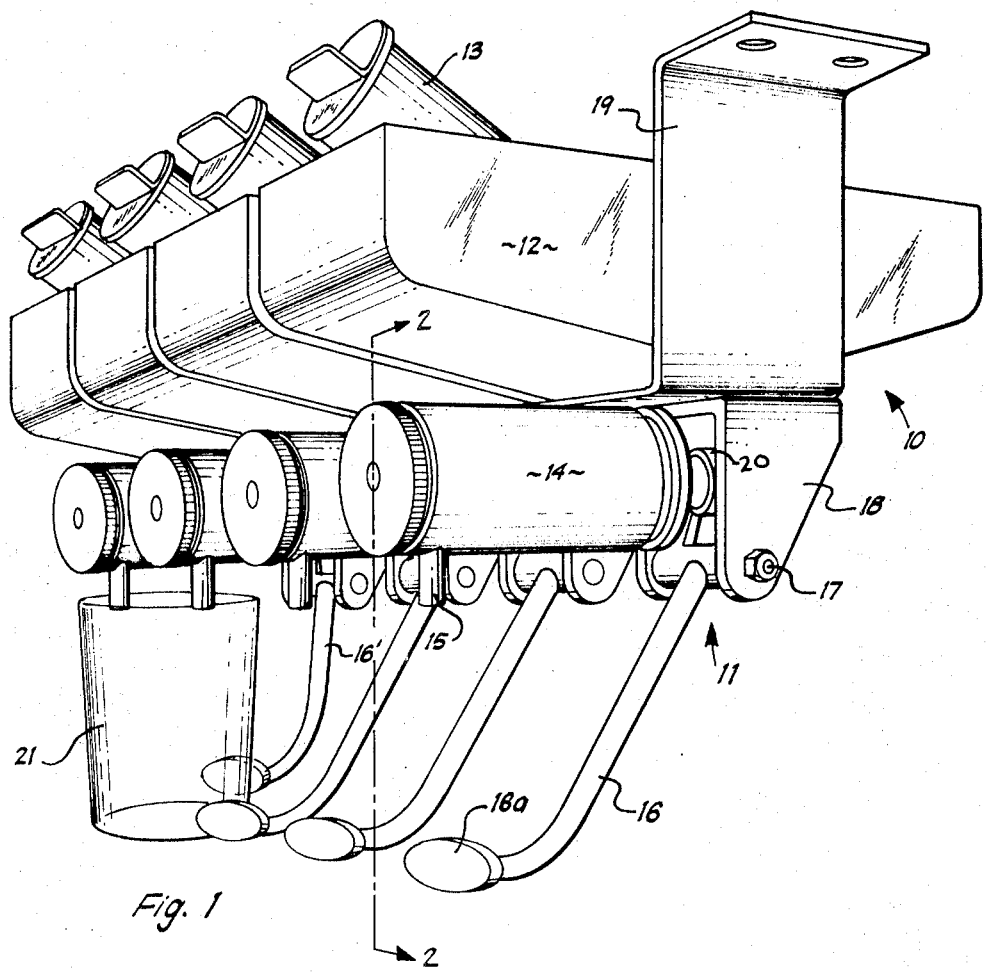
FIG. 1 is a perspective view of four measuring valves, each in accordance with the present invention.

Referring now to the drawings, and particularly to FIG. 1 thereof, there is shown an installation 10 including four measuring valves 11, each in accordance with the present invention. Associated with each valve 11 is a supply reservoir 12 which may be filled via a capped inlet tube 13 with a quantity of a liquid to be dispensed in measured amounts. A housing 14 contains the valve mechanism and includes a spout 15 through which a measured volume of the liquid is dispensed when a control lever 16 is moved from its rest position to an operative position such as that shown at 16′.

The operating lever 16 is pivotally mounted via a horizontal shaft 17 to an inverted U-shaped bracket 18 attached to the mounting bracket 19 which also supports the valve housing 14 and the supply reservoir 12. A spring-loaded actuating mechanism 20 is situated within the bracket 18.

For convenience, the operating lever 16 includes at the lower end a bumper 16a against which may be pressed a glass 21 to be filled via the measuring valve 11. The upper end of the control lever 16 comprises a yoke 16b having two prongs situated on opposite sides of the actuating mechanism 20, as evident in FIG. 3.

Referring now to FIG. 2, the housing 14 contains an interior, cylindrical chamber 22 which functions as the measuring chamber for the valve 11. Liquid from the supply reservoir 12 is provided to the measuring chamber 22 via an inlet opening 23 and an inlet chamber 24 within the housing 14. Liquid is dispensed via an outlet chamber 25 communicating between the other end of the measuring chamber 22 and the spout 15. Preferrably the inlet chamber 24 and the outlet chamber 25 each have a diameter greater than the diameter of the measuring chamber 22.

A valve stem 26 extends coaxially through the inlet chamber 24, the measuring chamber 22 and the outlet chamber 25. Fixedly attached to the valve stem 26 is a first valve disc 27 situated within the outlet chamber 25 and having a diameter greater than the diameter of the measuring chamber 22. The valve disc 27 seats against the shoulder 28 defined by the end of the measuring chamber 22 opening into the outlet chamber 25. An annular seal 29, attached to the surface 27a of the valve disc 27 facing the shoulder 28, insures leak-proof closure of the valve disc 27.

Also attached to the valve stem 26 is a second valve disc 30 situated within the inlet chamber 24 and having a diameter greater than the diameter of the measuring chamber 22. An annular seal 31 is attached to the surface 30a of the valve disc 30 facing the shoulder 32 defined by the end of the measuring chamber 22 opening into the inlet chamber 24.

The valve discs 27 and 30 are spaced by a distance slightly greater than the length of the measuring chamber 22. Typically, this excess distance is on the order of 0.030 inch. Thus when one of the valve discs 27, 30 abuts against the respective shoulder 28, 32 to close one end of the measuring chamber 22, the other of the valve discs 27,30 is spaced from its respective shoulder 28,32 to permit liquid flow into or out of the measuring chamber 22. Thus, in the closed position shown in FIG. 2, the valve disc 27 and annular seal 29 are seated firmly against the shoulder 28, thereby closing the outlet end of the measuring chamber 22. At the same time, the valve disc 30 and the annular seal 31 are spaced from the valve seat 32 at the inlet end of the measuring chamber 22. Accordingly, fluid supplied by the reservoir 12 can flow freely through the inlet opening 23 and the inlet chamber 24 to fill completely the measuring chamber 22.

The valve housing 14 is provided with a removable, threaded front end 34 having a central opening 35 to accommodate an end 26a of the valve stem 26. A bias spring 36 surrounds the shaft 26 within the outlet chamber 25 and extends between the housing end 34 and the valve disc 27. The spring 36 biases the valve stem 26 and the valve discs 27, 30 to the closed, measuring chamber filling position shown in FIG. 2.

The valve housing 14 also is provided with a removable, threaded rear end 37 having a central opening 38 through which projects the other end 26b of the valve stem 26. An O-ring 39 prevents fluid from the inlet chamber 24 from leading out via the opening 38. Similarly, O-ring 40 prevents leakage via the threaded interface between the end 37 and the valve housing 14.

Figure 3:
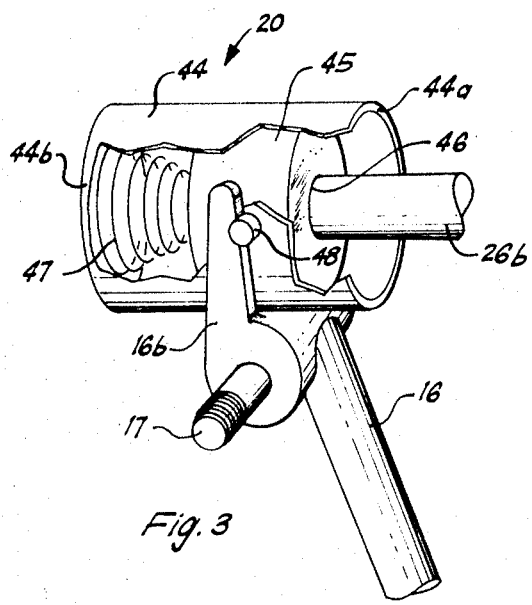
FIG. 3 is a fragmentary perspective view, partly broken away and in section, of the spring-loaded actuating mechanism, shown with the spring compressed.
Figure 4:
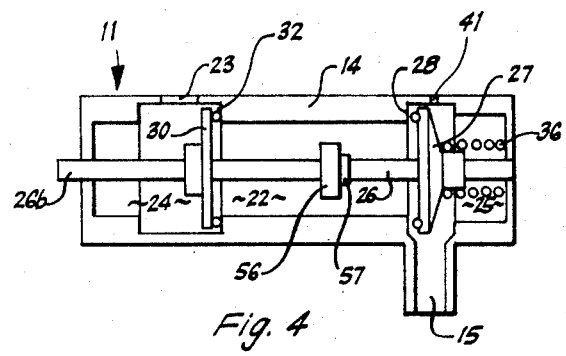
FIG. 4 is a simplified transverse sectional view of the inventive valve mechanism shown in the open or liquid-dispensing position.

Movement of the valve stem 26 and the valve discs 27, 30 from the closed or measuring chamber filling position shown in FIG. 2 to the open or liquid-dispensing position shown in FIG. 4 is accomplished using the spring-loaded actuating mechanism 20 shown in FIGS. 2 and 3. Referring thereto, the actuating mechanism 20 includes a cylindrical member 44 having an open front end 44a and a partially closed rear end 44b. Slidingly disposed within the cylindrical member 44 is a piston 45 having a counterbore 46 which receives the valve stem end 26b projecting rearwardly from the valve housing 14. A compression spring 47 is disposed within the cylindrical member 44 between the end 44b thereof and a recess 45a in the rear face of the piston 45.

As noted earlier, the prongs of the yoke 16b are situated on opposite sides of the cylindrical member 44. A pair of pins 48 project laterally from the cylindrical member 44 and are held against the yoke 16b by the action of the spring 47.

When the control lever 16 is pressed rearwardly, as by pushing a glass 21 against the bumper 16a, the yoke 16b displaces the pins 48 and the cylindrical member 44 toward the valve housing 14. At first, the piston 45 and the valve stem 26 do not move. Rather, the cylindrical member 44 moves relative to the piston 45, so as to compress the spring 47 as shown in FIG. 3. Eventually, when the lever 16 and the yoke 16b have moved through a sufficient angle, the force of the compressed spring 47 will exceed the force exerted by the bias spring 36. When this occurs, the loaded spring 47 rapidly will force the piston 45, the valve stem 26 and the valves 27, 30 to the open or liquid-dispensing position shown in FIG. 4. That is, the valve disc 30 and the seal 31 rapidly will be forced against the valve seat 32, and simultaneously, the valve 27 and the seal 29 will be spaced from the valve seat 28. No additional fluid will flow into the measuring chamber 22, and the exact volume of fluid contained within the measuring chamber 22 rapidly will flow out through the spout 15. A vent hole 41 extending from the outlet chamber 25 through the housing 14 wall insures smooth liquid flow.

Dispensing of an accurately measured volume of liquid is achieved consistantly as a result of the rapid actuation imparted by the mechanism 20. The short travel of the valve stem 26 and the valves 27, 30 (typically on the order of 0.030 inch) aids the performance of the measuring valve 11. The rate of travel of the valve stem 26 when moving from the closed to the open position is substantially independent of the amount of force exerted on the operating lever 16, and of the extent of travel of the lever 16.

When the lever 16 is released, as by removing the glass 21 from against the bumper 16a, the spring 47 pushes against the piston 45 so as to force rearward the cylindrical member 44, the pins 48, and the yoke 16b. This returns the control lever toward the rest position.

The bias spring 36 restores the valve stem 26 and the valves 27, 30 to the closed position shown in FIG. 2.

For simplicity of construction, the valve disc 27 may be formed as an integral part of the valve stem 26. The valve stem 30 may comprise a separate element having a central opening which slides over a flanged member 49 formed integral with the valve stem 26. A nut 50 threads onto the fitting 49 to maintain the valve disc 30 in place.

A particularly advantageous configuration for the seal 31 is shown in the detail of FIG. 5. Referring thereto the seal 31' is formed of a resilient material adhesively bonded to a groove 52 recessed in the face 30a of the valve disc 30. A pair of annular fingers 53, 54 integral with the seal 31' project forwardly from the valve disc face 30a. These fingers 53, 54 are separated by an annular slit 55 of generally V-shaped cross-section. The fingers 53, 54 abut against the valve seat 32' which preferably is tapered as shown in FIG. 5. This results in a positive seal which remains leak-proof even though one or the other of the fingers 53, 54 may not seat firmly against the shoulder 32'. The annular seal 29 of the valve disc 27 may be of like construction.

The amount of liquid dispensed by the measuring valve 11 is determined by the volume within the measuring chamber 22. The dispensed volume can be decreased by a controlled amount by providing within the chamber 22 certain elements 56 attached by means of clips 57 to the valve stem 26 (FIG. 4). When using the elements 56, a lesser volume of liquid will fill the measuring chamber 22. This permits the dispensing of a lesser, preselected amount of liquid.

By utilizing a measuring chamber 22 having a diameter less than that of the outlet chamber 25, no residual liquid is left within the chamber 22 after opening of the measuring valve 11. Accordingly, the measuring valve 11 disclosed herein is particularly well suited for utilization in aircraft environments. Thus the embodiment 10 shown in FIG. 1 may be mounted in an aircraft galley, or attached to the cart typically used by a stewardess when serving drinks to aircraft passengers. Utilization of the apparatus 10 permits dispensing of four different types of liquor in accurately controlled amounts, thereby eliminating the need for pre-packaged "splits" now used on board aircraft. Of course, any number of valve mechanisms 11 may be mounted together. Moreover, two or more valve mechanisms 11 may be supplied from the same reservoir 12.

As an optional feature, not shown, the valve stem 26 may extend beyond the valve housing end 34, and be connected to a counter (not shown). The counter may be incremented by one each time the valve 11 is actuated, so as to keep an accurate tally of the number of measured units dispensed. Such a counter thus may provide an accounting basis for determining how much money should have been collected for the number of drinks dispensed.

I claim:

1. In a measuring valve of the type wherein a preestablished volume of liquid is dispensed when a valve stem is moved from a closed to an open position, the improvement comprising:
   a bias spring for applying a first axial force to said valve stem to bias said valve stem to said closed position; and
   a valve actuating mechanism comprising:
      a cylinder, an actuating piston slidingly disposed within said cylinder and attached to one end of said valve stem, an actuating spring disposed within said cylinder between said piston and an end of said cylinder for applying a second axial force to said valve stem in a direction opposite to said first axial force, said first force being significantly greater than said second force so that a substantial compression of said actuating spring is required for said second force to overcome said first force, and means for displacing said cylinder toward said valve stem to cause compression of said actuating spring against said piston, whereby after significant movement of said cylinder toward said valve stem the second force of said actuating spring exceeds the first force of said bias spring rapidly moving said piston and said valve stem to said open position.

2. A measuring valve according to claim 1 further comprising:

a pivotally mounted actuating lever, one end of said lever forming a yoke, and means operatively connecting said yoke to said cylinder, whereby pivotal motion of said lever causes displacement of said cylinder to compress said actuating spring.

3. A measuring valve according to claim 2 wherein the other end of said lever is situated beneath the liquid outlet of said valve, thereby permitting motion to be imparted to said lever by a glass positioned to receive liquid dispensed from said valve.

4. A measuring valve according to claim 2 further comprising a liquid reservoir supplying said measuring valve, said reservoir having a horizontal dimension substantially greater than the height of said reservoir, thereby maintaining a substantially constant pressure head regardless of how much liquid remains in said reservoir.

5. A measuring valve comprising:
1. a chamber having inlet and outlet ends and adapted to contain a measured volume of liquid,
2. valve means connected to a shaft (a) for closing said outlet end and opening said inlet end when said shaft is in a first position, thereby permitting entry of liquid via said inlet end to fill said chamber, and (b) for opening said outlet end and closing said inlet end when said shaft is in a second position, thereby dispensing via said outlet end the measured volume of liquid contained in said chamber,
3. bias means for applying a first axial force to said shaft for biasing said valve means and shaft to said first position,
4. compressible means for applying a second axial force to said shaft in a direction opposite to said first axial force, said first force being significantly greater than said second force so that said valve means and said shaft normally remain in said first position, a substantial compression of said compressible means being required for said second force to overcome said first force, and
5. lever operated actuating means for causing compression of said compressible means to move said valve means and said shaft to said second position when said second force exerted by said compressible means exceeds said first force exerted on said shaft by said bias means.

6. A measuring valve according to claim 5 wherein said compressible means comprises a spring and wherein said actuating means comprises:

a cylindrical member, a piston slidingly disposed within said cylindrical member and connected to said shaft, said spring being situated within said cylindrical member between an end thereof and said piston, and yoke means connecting said lever to said cylindrical member, whereby motion of said lever transmitted via said yoke means to said cylindrical member causes compression of said spring against said piston, sufficient compression overcoming the bias on said shaft and causing said piston to move said shaft to said second position.

7. A measuring valve according to claim 5 wherein said chamber is interiorly cylindrical and includes a central region situated between an inlet region and an outlet region each having a diameter greater than that of said central region, wherein said shaft extends coaxially through said chamber, and wherein said valve means comprises first and second valve discs concentrically attached to said shaft and situated respectively within said inlet and outlet regions, the diameter of each said disc being greater than the diameter of said central region but less than the diameter of the respective inlet or outlet region containing said disc.

8. A measuring valve according to claim 7 wherein the shoulders at each end of said central region function as valve seats for said valve discs, and further comprising an annular seal attached to the surface of each said valve disc facing the respective valve seat shoulder.

9. A measuring valve according to claim 8 wherein each shoulder is tapered and wherein said seal comprises a ring of resilient material adhesively bonded to an annular groove in said valve disc surface, said seal having a pair of annular sealing fingers projecting from said groove to contact said tapered shoulder.

10. A measuring valve according to claim 7 wherein said chamber is interior of a valve housing having threaded, removable ends respectively forming the ends of said inlet and outlet regions, wherein said shaft projects through said inlet region end to said actuating means, and wherein said bias means comprises a spring situated around said shaft within said outlet region between said outlet region end and said second valve disc.

11. A measuring valve according to claim 10 further comprising a reservoir supplying liquid to said inlet region, said reservoir having a horizontal dimension substantially greater than the height thereof, whereby the pressure head into said measuring valve remains substantially independent of how much liquid is in said reservoir.

12. A measuring valve according to claim 10 further comprising one or more elements clipped to said shaft between said valve discs to reduce the liquid capacity of said central region to a selected volume, thereby permitting control of the amount of liquid dispensed at each actuation of said measuring valve.

13. A device for dispensing a measured volume of liquid comprising:

a. a valve housing having interior thereof an inlet chamber at one end, an outlet chamber at the other end, and a measuring chamber communicating therebetween, the diameter of said measuring chamber being less than the diameters of said inlet and outlet chambers, the shoulders of said measuring chamber thereby forming first and second valve seats, b. a valve stem extending through said valve housing and adapted to move between a valve open position and a valve closed position, c. a first valve disc situated within said inlet chamber and attached to said valve stem, said first valve disc seating against the first valve seat when said valve stem is in said open position, d. a second valve disc situated within said outlet chamber and attached to said valve stem, said second valve disc seating against said second valve seat when said valve stem is in said closed position, e. a fluid inlet communicating into said inlet chamber and a fluid outlet communicating out of said outlet chamber, f. bias means for applying a first axial force to said valve stem for biasing said valve stem to said closed position, and g. a valve actuating mechanism comprising:
a cylinder,
an actuating piston slidingly disposed within said cylinder and attached to one end of said valve stem,
an actuating spring disposed within said cylinder between said piston and an end of said cylinder for applying a second axial force to said valve stem in a direction opposite to said first axial force, said first force being significantly greater than said second force so that a substantial compression of said actuating spring is required for said second force to overcome said first force, and
means for displacing said cylinder toward said valve stem to cause compression of said actuating spring against said piston, whereby after significant movement of said cylinder toward said valve stem the second force of said actuating spring exceeds the first force of said bias spring rapidly moving said piston and said valve stem to said open position.

14. A liquid dispensing device according to claim 13 wherein said means for displacing comprises:
a lever arm having a yoke at one end and a bumper at the other end,
means for mounting said lever to pivot about an axis generally perpendicular to said valve stem and situated nearer said yoke than to said bumper,
a pair of pins projecting laterally from said cylinder, said yoke partly surrounding said cylinder against said pins, whereby pushing said bumper causes said lever to pivot about said axis and force said yoke against said pins to displace said cylinder and actuate said liquid dispensing device.

15. A liquid dispensing device according to claim 14 wherein said bias means comprises a spring surrounding said valve stem and situated within said outlet chamber between one end of said valve housing and said second valve disc, and wherein said valve stem projects through the other end of said valve housing to said piston.

* * * * *